J. G. FUNK.
VEHICLE TIRE.
APPLICATION FILED NOV. 4, 1911.
1,035,870.
Patented Aug. 20, 1912.
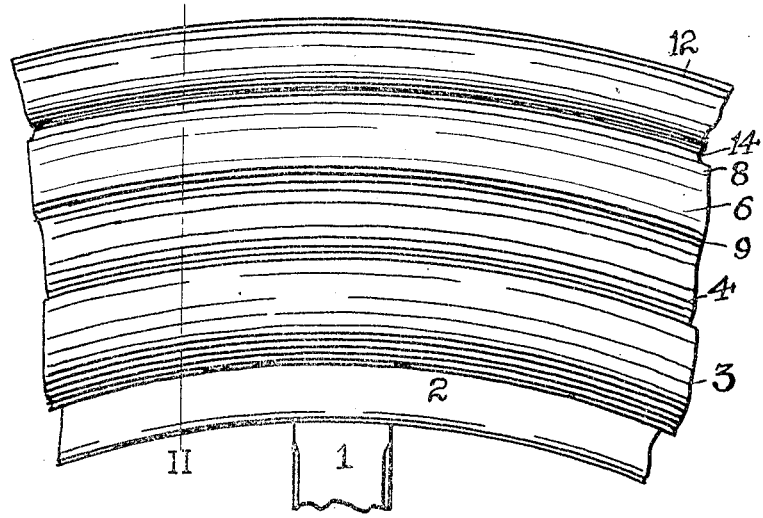
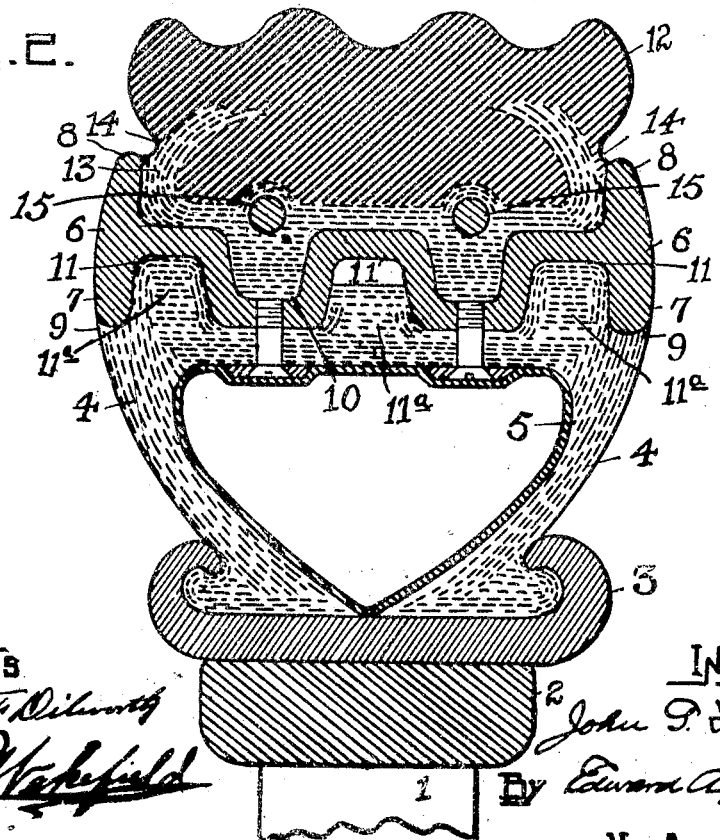
WITNESSES
INVENTOR
John G. Funk,
By Edward A. Lawrence,
HIS ATTORNEY

UNITED STATES PATENT OFFICE.

JOHN G. FUNK, OF SWISSVALE BOROUGH, PENNSYLVANIA.

VEHICLE-TIRE.

1,035,870.

Specification of Letters Patent. Patented Aug. 20, 1912.

Application filed November 4, 1911. Serial No. 658,474.

*To all whom it may concern:*

Be it known that I, JOHN G. FUNK, a citizen of the United States, and residing in the borough of Swissvale, in the county of Allegheny and State of Pennsylvania, have invented or discovered new and useful Improvements in Vehicle-Tires, of which the following is a specification.

My invention consists of a new and improved tire for automobiles and other vehicles.

More particularly it relates to improvements in that class of "puncture proof" tires which are composed of a shoe or casing mounted on the rim of the wheel and containing an inflated inner tube, an outer rim mounted on said shoe, and a tread mounted on said outer rim. In such tires the outer rim is usually provided with inwardly extending flanges which embrace the shoe and assist in holding the rim in place. In practice I have found that the compressive jars of travel exerted on such rims, which are of resilient metal, result in tension strains exerted on their flanges, cracking the flanges inwardly toward the body of the rim and destroying the usefulness of the tire. I have overcome this tendency by forming in the body of the rim one or more inwardly extending radial depressions or corrugations of at least equal depth with the flanges. These corrugations assume the tension strains without danger of rupture and have been found to entirely prevent flange cracking. They also assist the flanges in maintaining the rims in place on the shoes.

To assist the corrugations and flanges in maintaining the rim in place on the shoe, especially in case of the collapse of the inner tube, I prefer to provide set screws which engage the shoe and seat in threaded holes in the outer rim.

The side flanges not only extend inwardly but also outwardly in a radial direction and between said flanges is seated the tread which is preferably composed of rubber strengthened by embedded fabric and vulcanized in place on said corrugated rim. The tread is then firmly secured to the rim against creeping, and may be further strengthened by circumferential wires embedded therein.

Outside of the rim flanges indentations or grooves are formed in the sides of the tread, outside of which grooves said tread extends laterally to substantially the full width of the tires. Said grooves permit the compression of the tread in travel without cutting the body of the same against the edges of the rims.

The fabric embedded in the material of the tread prevents undue stretching of the tread from travel, thus reducing the danger of cutting or tearing.

In the accompanying drawings, Figure 1 is a side elevation of a segment of my tire mounted on the rim of a vehicle wheel, and Fig. 2 is a cross section of the same along the line II—II in Fig. 1.

The following is a detailed description of the drawings. 1 is a spoke of a wheel, and 2 its felly upon which is mounted the rim 3, shown as of the plain clencher type for the sake of illustration.

4 is a shoe or outer casing mounted on the rim 3, hereinafter termed the "inner rim," and containing the usual inflated inner tube 5.

6 is the outer rim, comprising a hoop of suitable material, mounted on the shoe 4 and provided with inwardly extending edge flanges 7—7 and outwardly extending edge flanges 8—8 integral therewith. The flanges 7—7 embrace the outer side walls of shoe 4 which side walls are extended laterally as at 9—9 to cover the edges of said flanges 7—7.

The hoop or rim 6 is, throughout its width, provided with a plurality of longitudinal bends, forming, on the outer periphery thereof, a series of circumferential, spaced pockets 10, and, on the inner periphery thereof, a second series of similar pockets 11 (as clearly shown in Fig. 2), the pockets of one series being staggered with relation to those of the other series. The pockets of said second series are occupied by circumferential ribs 11$^a$, on the shoe 4, the central rib 11$^a$, as shown in Fig. 2, extending upwardly only partially into the central seat or pocket 11.

The corrugations 10—10 are at least of the same depth as the flanges 7—7 so as to safely assume in the body of the rim 6 the tension strains which the flanges 7—7 cannot otherwise resist without cracking, as explained above.

The form of rim which I show is substantially a truss in structure and therefore of the greatest strength to resist breaking, crushing or rupturing strains.

The tread structure comprises, preferably, a tread proper 12 of any suitable material, preferably rubber, having embedded therein an inner facing of textile material, portions of which occupy said pockets 10; the fabric being vulcanized to the rim 6 and to the flanges 8, 8, so that the tread can neither creep nor be laterally displaced.

Outside of the flanges 8—8 the sides of the tread 12 are provided with circumferential grooves 14—14, outside of which grooves the tread extends laterally to the full width of the tire. When the tread is compressed and flattened in travel, such compression is taken up by said grooves so that the material of the tread is not forced down upon and cut by the edges of flanges 8—8. 15—15 are strengthening and stiffening wires preferably embedded in the body of the tread. The longitudinal ends of said fabric facing 13 are brought up, as shown in Fig. 2, inside the flanges 8—8 and inwardly toward the outer center of the tread, thus stiffening the portion of the tread contained between the flanges 8—8 and confining the greater portion of the tread above the grooves 14—14, and also preventing undue stretching of the tread.

To assist in retaining the rim 6 on the shoe 4, especially where the inner tube 5 is collapsed, I prefer to provide set screws 16—16 which pass through the wall of shoe 4 and engage threaded holes in the corrugations 10—10 of the rim 6.

As noted above the central rib 11ª of the shoe 4 does not extend clear up into the central seat or pocket 11. However, when the inner tube is fully inflated and the tire is in use the material of the shoe is forced farther up into said seat 10, thus increasing the attachment between the shoe and the tire.

In operation, I have found that the body portion of my rim 4, by reason of its peculiar structure, is susceptible of a slight spring or yield under jar and sudden stress, which very materially aids in preventing breaking of the end flanges 7, 8. The danger of breaking of said flanges is, as before noted, an essential object of my invention to overcome.

What I desire to claim is:

1. As an article of manufacture, a wheel-rim comprising a hoop of suitable material carrying circumferential edge flanges, and provided, throughout its width, with a plurality of longitudinal bends, forming, on the outer periphery thereof, a series of circumferential spaced pockets, and, on the inner periphery thereof, a series of similar pockets, the pockets of one series being staggered with relation to the pockets of the other series.

2. As an article of manufacture, a wheel-rim comprising a hoop of suitable material carrying inward- and outward- projecting, circumferential, edge flanges, and provided, throughout its width, with a plurality of longitudinal bends, forming, on the outer periphery thereof, a series of circumferential spaced pockets, and, on the inner periphery thereof, a series of similar pockets, the pockets of one series being staggered with relation to the pockets of the other series.

3. In a vehicle tire, the combination with a shoe mountable on the rim of a wheel, a rim mounted on the perimeter of said shoe, and comprising a hoop of suitable material carrying circumferential edge flanges, and provided, throughout its width, with a plurality of longitudinal bends, forming, on the outer periphery thereof, a series of circumferential, spaced pockets, and, on the inner periphery thereof, a second series of similar pockets, the pockets of one series being staggered with relation to the pockets of the other series, and circumferential ribs carried by said shoe and occupying the pockets of said second series.

Signed at Pittsburgh, Penna., this 2nd day of November, 1911.

JOHN G. FUNK.

Witnesses:
 EDWARD A. LAWRENCE,
 J. H. HARRISON.